United States Patent [19]

Doyle

[11] Patent Number: 5,271,588
[45] Date of Patent: Dec. 21, 1993

[54] MULTI-PIECE TUBE CLAMP

[75] Inventor: Vincent L. Doyle, West Chester, Ohio

[73] Assignee: General Electric Company, Cincinnati, Ohio

[21] Appl. No.: 914,339

[22] Filed: Jul. 17, 1992

[51] Int. Cl.$^5$ ............................................. F16L 3/22
[52] U.S. Cl. ........................... 248/68.1; 248/744; 411/508
[58] Field of Search .................... 248/68.1, 74.4, 74.5, 248/67.7, 67.5; 138/112; 411/508, 509, 510, 913

[56] References Cited

U.S. PATENT DOCUMENTS

| | | | |
|---|---|---|---|
| 2,788,047 | 4/1957 | Rapata | 411/913 X |
| 3,180,390 | 4/1965 | Ockert, Jr. | 151/69 |
| 3,192,980 | 7/1965 | Sauter | 151/41.5 |
| 3,508,774 | 4/1970 | Simonson | 287/189.36 |
| 3,728,761 | 4/1973 | Holly | 411/913 X |
| 3,856,244 | 12/1974 | Menshen | 248/67.5 |
| 3,982,304 | 9/1976 | Menshen | 248/68.1 |
| 4,031,935 | 6/1977 | Jones et al. | 151/41.76 |
| 4,036,692 | 7/1977 | Walton | 176/76 |
| 4,273,465 | 6/1981 | Schoen | 248/68.1 X |
| 4,760,495 | 7/1988 | Till | 411/509 X |
| 4,810,145 | 3/1989 | Villas | 411/206 |
| 4,854,795 | 8/1989 | Duran | 411/352 |
| 4,906,152 | 3/1990 | Kurihara | 411/913 X |
| 5,033,701 | 7/1991 | Kraus | 248/68.1 |

OTHER PUBLICATIONS

GE Aircraft Engines, "Generic Hardware Selection For Configuration Design," EVE-SPL-29, Dec. 14, 1990, pp: cover, Table of Contents, and p. 13-2.

Primary Examiner—Ramon O. Ramirez
Attorney, Agent, or Firm—Jerome C. Squillaro

[57] ABSTRACT

A clamp for mounting a tube to a support plate in a gas turbine engine includes a base plate and a capture plate for capturing the tube therebetween, with a fastener positionable through the base and capture plates for clamping them together and mounting the tube to the support plate. A tubular retainer extends through the base and capture plates for retaining them together when the fastener is removed.

9 Claims, 2 Drawing Sheets

MULTI-PIECE TUBE CLAMP

The present invention relates generally to gas turbine engines, and, more specifically, to a clamp for securing tubes within the engine against movement, including vibratory movement, therein.

BACKGROUND OF THE INVENTION

A gas turbine engine such as that used for powering an aircraft in flight, for example, includes numerous tubes for channeling various fluids through the engine during operation. Conventional clamps are used for mounting the tubes to the engine casing, at standoff brackets for example, to accurately position the tubes and prevent their movement during operation of the engine.

Since the gas turbine engine includes various rotating components, the tubes are subject to vibratory excitation which must be controlled for preventing vibratory fatigue damage thereto. One exemplary conventional tube clamp used in an aircraft gas turbine engine has two clamp halves pivoted together at respective first ends thereof so that the clamp halves may be opened for inserting one or more tubes therebetween, and then pivoted together to capture the tubes. Each clamp halve typically includes a generally semicircular recess which collectively surround a respective tube, and a fastener hole extends through the tube clamp halves so that a suitable fastener, such as a bolt, may be inserted through the holes, with a complementary nut joined to the bolt for clamping together the two clamp halves around the one or more tubes therein. The fastener typically also extends through an engine mounted bracket for joining the tube clamp and the tubes therein to the engine casing.

Conventional tube clamps are typically made of suitable metals such as aluminum, stainless steel, or Inconel which are selected for use in the engine depending upon the temperature of the individual location from relatively cool near the fan of the engine to relatively hot near the combustor and turbines thereof. Since metal tube clamps are known to abrade or chafe the tubes contained therein due to vibratory excitation of the tubes during engine operation, a conventional wear sleeve, made of epoxy for example, is positioned between the tube and the tube clamp to prevent undesirable wear of the tube during operation.

These conventional tube clamps including wear sleeves are relatively complex in structure, manufacture, and assembly thereof, and collectively add substantially to the weight of the engine. The wear sleeve is an additional part and must be suitably secured to the tube to prevent its liberation therefrom during operation of the engine which is undesirable. Furthermore, metal is known to be a poor vibration damper, and therefore the metal tube clamps provide little vibratory damping of the tubes contained therein being subject to vibratory excitation during operation of the engine.

SUMMARY OF THE INVENTION

A clamp for mounting a tube to a support plate in a gas turbine engine includes a base plate and a capture plate for capturing the tube therebetween, with a fastener positionable through the base and capture plates for clamping them together and mounting the tube to the support plate. A tubular retainer extends through the base and capture plates for retaining them together when the fastener is removed.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which.

DESCRIPTION OF THE PREFERRED EMBODIMENT(S)

Figure 1:
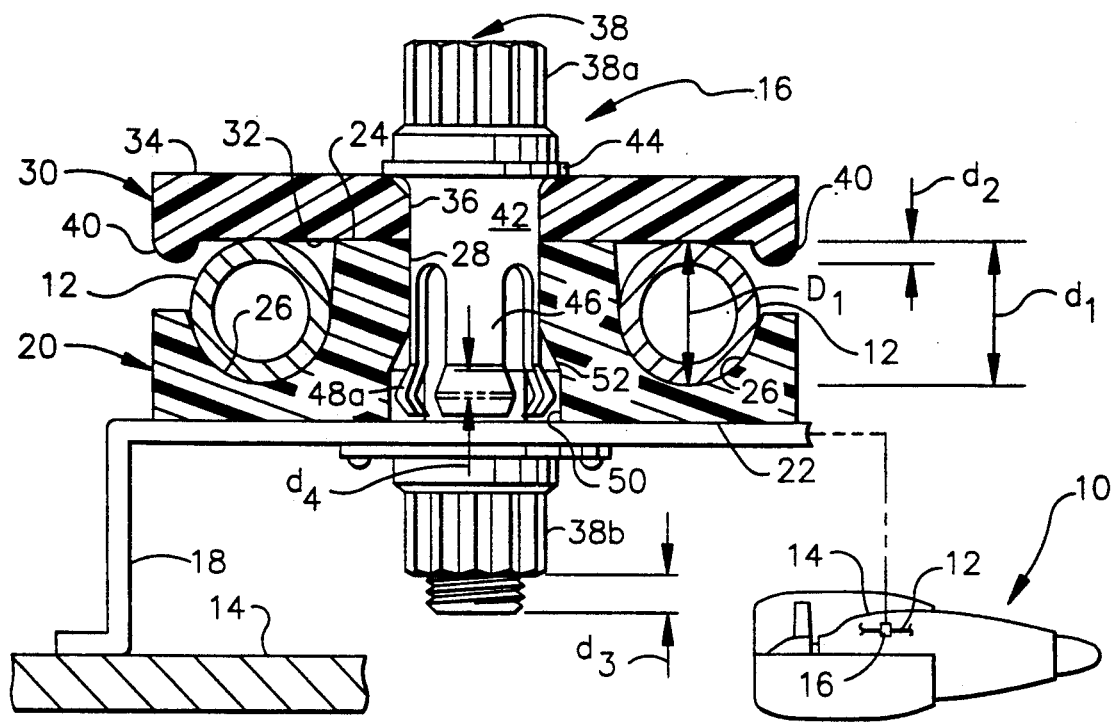
FIG. 1 is a schematic representation of an exemplary aircraft gas turbine engine having a clamp in accordance with one embodiment of the present invention for mounting a pair of tubes therein.

Illustrated schematically in FIG. 1 is an exemplary aircraft, turbofan, gas turbine engine 10 having an exemplary tube 12 therein which is mounted to an outer casing 14 thereof by a tube clamp 16 in accordance with one embodiment of the present invention. In this exemplary embodiment, a conventional support plate 18, or bracket, which may take any suitable form, is conventionally secured to the outer casing 14 for providing a standoff therefrom for the tube 12, e.g. pair of tubes 12, mounted thereto by the clamp 16.

The tube clamp 16 includes a base plate 20, or lower clamp half, having a flat lower surface 22 disposed on the support plate 18; a flat upper surface 24 having an arcuate, semi-circular, first recess 26 therein for receiving the tube 12; and a first hole 28 spaced laterally from the first recess 26 and extending through the base plate 20 from the lower to upper surfaces 22 and 24 thereof. A capture plate 30, or upper clamp half, is positioned above the base plate 20 and includes a lower surface 32 facing the base plate upper surface 24; an upper surface 34; and a second hole 36 extending through the capture plate 30 from the lower to upper surfaces 32 and 34 thereof.

Although the tube clamp 16 illustrated in FIG. 1 could be configured for clamping a single one of the tubes 12, in this exemplary embodiment it is symmetrically configured for identically clamping two tubes 12 with the base plate 20 including a pair of the first recesses 26 disposed on opposite sides of the base plate first hole 28 for receiving the pair of the tubes 12, respectively. The capture plate 30 extends laterally on both sides of the second hole 36 for capturing both tubes 12.

The base plate 20 and the capture plate 30 are joinable together for coaxially aligning together the first and second holes 28, 36 to provide a common aperture through which is positionable a fastener 38 which extends also into the support plate 18 for clamping the capture plate 30 to the base plate 20, with the capture plate lower surface 32 being effective for clamping the tubes 12 against the first recesses 26. In the exemplary embodiment illustrated in FIG. 1, the fastener 38 includes a conventional bolt 38a which extends through the first and second holes 28, 36 and through the support plate 18, and a conventional nut 38b threadingly engages the bolt 38a so that the bolt 38a may be torqued for clamping together the base and capture plates 20, 30 around the tubes 12. FIG. 1 illustrates the tube clamp 16 in its assembled and clamped position around the tubes 12 for supporting the tubes 12 to the support plate 18.

Figure 2:
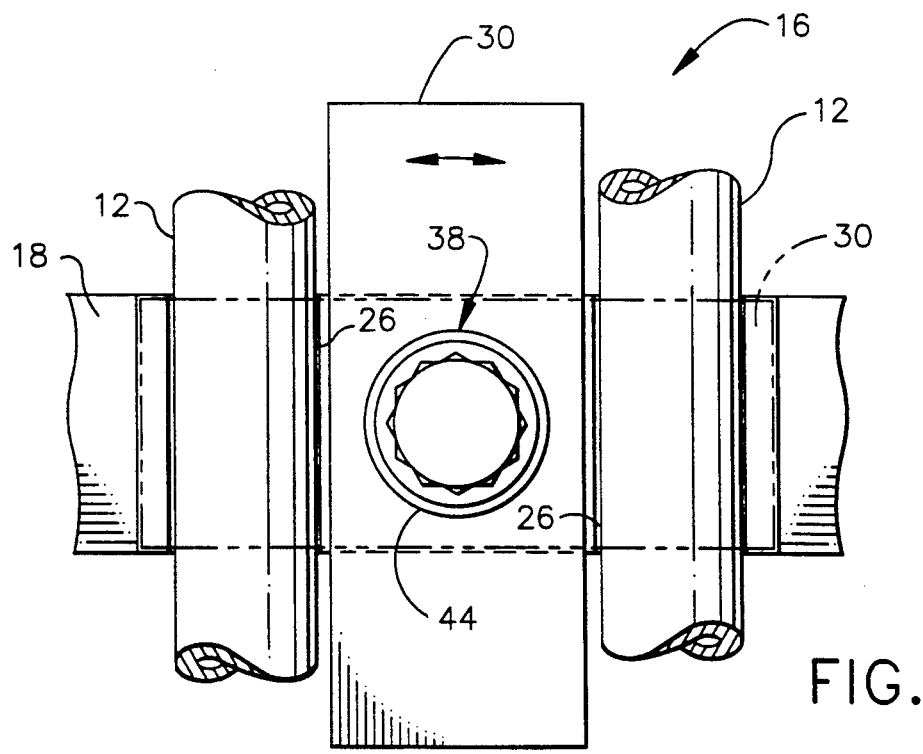
FIG. 2 is a top view of the clamp illustrated in FIG. 1 shown with the capture plate rotated for allowing the tubes to be inserted into or withdrawn from the base plate recesses thereof.

FIG. 2 is a top view of the tube clamp 16 illustrated in FIG. 1 showing in phantom line the tube clamp 16 assembled and clamped to the tubes 12 in a closed position, and in solid line in an open position for allowing assembly thereto and disassembly therefrom of the tubes 12. More specifically, the capture plate 30 is pivotable about the fastener 38 when the fastener 38 is unloaded, which occurs by removing torque from the bolt 38a by partially unscrewing it relative to the nut 38b. This allows the capture plate 30 to be displaced or rotated clockwise or counterclockwise as shown in FIG. 2 to displace the capture plate lower surface 32 (see FIG. 1) away from the base plate first recesses 26 for allowing the tubes 12 to be inserted into and withdrawn from the first recesses 26 perpendicularly thereto without obstruction by the capture plate 30, while the capture plate 30 is still joined to the base plate 20.

The base plate first hole 28 is disposed perpendicularly to the base plate upper surface 24 as illustrated in FIG. 1, and the first recesses 26 extend into the base plate upper surface 24 with their longitudinal axes, or centers of curvature, being disposed parallel to the capture plate upper surface 24 and parallel to, for example coaxially with, the centerline axes of the tubes 12. In this way, the capture plate 30 may be rotated clockwise as shown in FIG. 2 to open the tube clamp 16 and allow full access to the first recesses 26 so that the tubes 12 may be inserted therein or removed therefrom. The capture plate 30 may then be rotated counterclockwise as shown in FIG. 2 from its solid to its phantom position over the tubes 12 disposed in the first recesses 26 to capture the tubes 12 therein. The fastener 38 may then be suitably torqued to clamp together the base and capture plates 20 and 30 for securing the tubes 12 to the support plate 18.

Referring again to FIG. 1, each of the tubes 12 has an outer diameter $D_1$, and each of the first recesses 26 has a complementary curvature, for example a radius equal to half the outer diameter $D_1/2$ of the tube 12, for providing continuous contact therewith upon assembly. In the embodiment illustrated in FIG. 1, the first recess 26 has a first depth $d_1$ measured relative to the flat base plate upper surface 24 adjacent the first hole 28 which is preferably less than the tube outer diameter $D_1$ and which is preselected for providing a predetermined compressive load on the tubes 12 when the fastener 38 clamps together the base and capture plates 20, 30. Preferably, the first recess 26 is sized for receiving the entire tube outer diameter $D_1$. The first depth $d_1$ may be equal to the tube outer diameter $D_1$, with the capture plate 30 providing a zero interference fit therewith for retaining the tubes 12 in the first recesses 26. However, in practice, the depth $d_1$ of the first recess 26 is selectively less than the tube outer diameter $D_1$ to provide a predetermined interference fit when the capture plate 30 is clamped against the base plate 20 and the top of the tube 12 for providing a predetermined compressive load thereon.

The capture plate 30 preferably includes a pair of opposite distal ends 40 in the form of lips extending toward the base plate upper surface 24. Each lip 40 is positionable adjacent to a respective tube 12 on an opposite side thereof relative to the capture plate second hole 36 and the fastener 38 positionable therethrough. The capture plate lower surface 32 is preferably completely flat at least up to the lips 40. The lip 40 preferably has a lip depth $d_2$ relative to the flat capture plate lower surface 32 at the second hole 36 which is less than the tube outer diameter $D_1$ for preventing rotation of the capture plate 30 about the fastener 38 when the capture plate 30 abuts the base plate 20. During assembly of the tube clamp 16, the capture plate 30 is positioned over the two tubes 12 and against the base plate 20. As the fastener 38 is tightened, the lips 40 prevent the capture plate 30 from rotating due to friction between it and the head of the bolt 38a since the lip 40 is in contact with the tube 12 and would have to move upwardly relative thereto in order to allow the capture plate 30 to rotate, which upward movement is prevented by the abutting contact between the capture plate 30 and the base plate 20 at the first and second holes 28, 36.

Referring again to FIG. 1, the tube clamp 16 preferably further includes a tubular retainer 42, also referred to as a spring insert, which extends through the first and second holes 28 and 36 of the base and capture plates 20, 30 for retaining or joining together the base and capture plates 20, 30 while allowing rotation therebetween about the coaxially disposed retainer 42 and fastener 38. The retainer 48 loosely joins together the base and capture plates 20, 30 without the fastener 38 therein to provide a multi-piece assembly which improves maintainability of the engine 10 and assembly and disassembly of the tube clamp 16 from the tubes 12.

Figure 3:
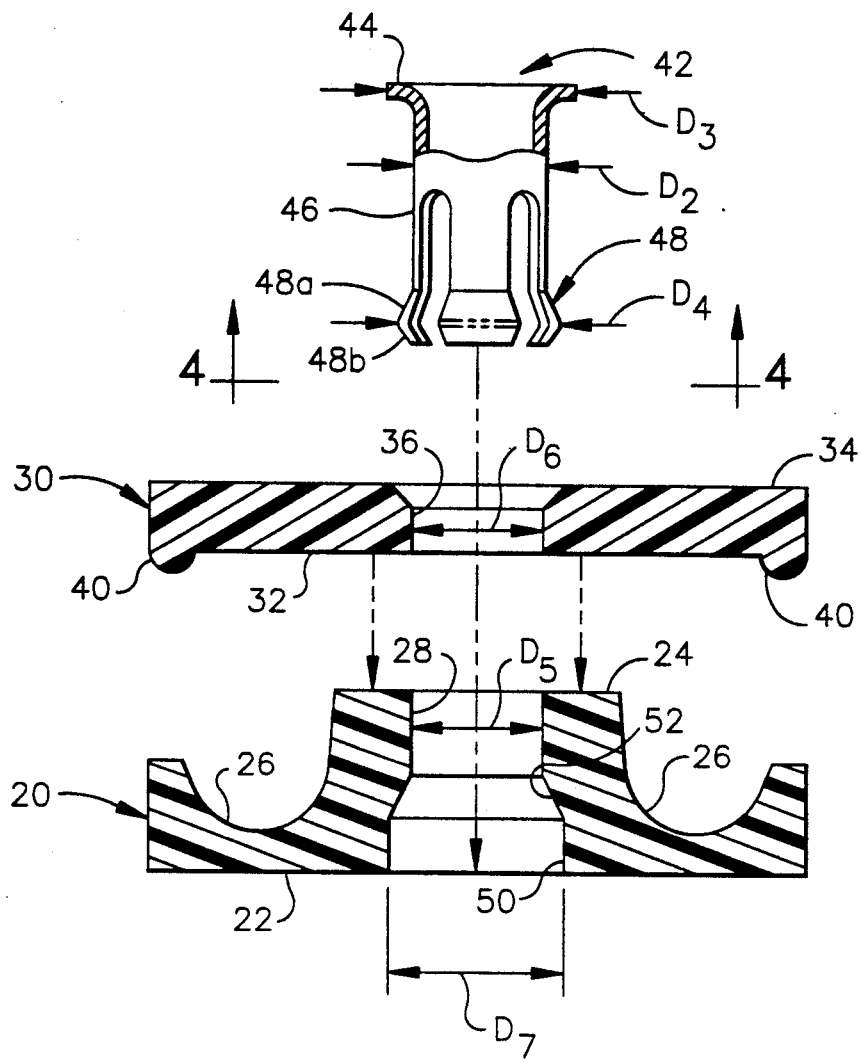
FIG. 3 is an exploded view of the tube clamp illustrated in FIG. 1.
Figure 4:
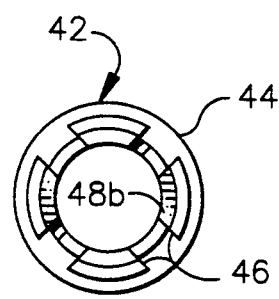
FIG. 4 is an end view of the tube clamp retainer illustrated in FIG. 3 taken along line 4—4.

More specifically, and referring to both FIGS. 1 and 3, the retainer 42 preferably includes an annular lip or collar 44 at a proximal end thereof, and a plurality of circumferentially spaced apart, integral cantilever fingers or springs 46, four being shown in more particularity in FIG. 4, which extend from the collar 44 to the distal end of the retainer 42. Each of the springs 46 preferably includes an enlarged portion in the form of a hook 48 at the retainer distal end for securing the retainer 42 and capture plate 30 to the base plate 20. More specifically, the retainer 42 extends through the first and second holes 28, 36, with the collar 44 being disposed on the capture plate upper surface 34, and the springs 46 extending into a counterbore 50 in the base plate 20 so that the hooks 48 loosely join the retainer 42 to the base plate 20 in the counterbore 50. The counterbore 50 is simply an enlargement of the first hole 28 which extends into the base plate lower surface 22 coaxially with the first hole 28.

As shown in exploded view in FIG. 3, the retainer 42 has a nominal outer diameter $D_2$ between its proximal and distal ends, with the collar 44 having an outer diameter $D_3$ which is suitably larger than the diameter $D_2$, and the hooks 48 collectively being disposed at an outer diameter $D_4$ which is also preferably larger than the diameter $D_2$. Each of the hooks 48 has a generally V-shaped transverse section, with the apexes thereof being disposed on the common diameter $D_4$. The inner diameter of the fastener 42 is sized for receiving therethrough the shank of the bolt 38a of the fastener 38 for clamping the capture plate 30 to the base plate 20, with the capture plate lower surface 32 being effective for clamping the tubes 12 against the first recesses 26. The inner diameters $D_5$ and $D_6$ of the first and second holes 28, 36, respectively, are equal to each other and are suitably larger than the diameter $D_2$ of the retainer 42 so that the retainer 42 may be positioned therethrough. The diameter $D_7$ of the counterbore 50 is suitably larger than the diameter $D_5$ of the first hole 28 to accommodate the hooks 48. And, the diameter $D_3$ of the collar 44 is preferably larger than the diameter of the head of the bolt 38a to provide a larger surface area under the bolt head to spread the bolt compression load to the capture plate 30. This reduces the per unit load on the capture plate 30, and, therefore, reduces the likelihood of damage to the capture plate 30.

As illustrated in FIG. 3, each of the hooks 48 has upper and lower surfaces 48a and 48b which are inclined relative to the springs 46 and intersect with each other at an obtuse included angle therebetween to define the generally V-configuration thereof. The diameter $D_4$ of the retainer 42 at the hooks 48 is predeterminedly greater than the diameter $D_6$ of the second hole 36, and similarly greater than the diameter $D_5$ of the first hole 28, so that the retainer springs 46 compress toward each other for allowing insertion of the retainer 42 firstly through the second hole 36 and then through the first hole 28 for joining together the capture plate 30 to the base plate 20. The retainer 42 may be simply pressed through the second hole 36 with the hook lower surfaces 48b being compressed together by the second hole 36 as the retainer 42 is pushed therethrough. The springs 46 will then be deflected radially inwardly toward each other as the hooks 48 slide along the inner surfaces of the second hole 36 and the first hole 28. When the hooks 48 pass into the counterbore 50, the springs 46 are allowed to expand to their original configuration and outer diameter $D_4$, thus locking the retainer 42 into the counterbore 50 as shown in FIG. 1. As shown more clearly in FIG. 3, the counterbore 50 preferably includes a conical seat 52 extending to the first hole 28 with its diameter decreasing from $D_3$ to $D_5$. The inclination of the hook upper surfaces 48a is preferably complementary or parallel to the inclination of the conical seat 52 for abutting contact therewith for joining the retainer 42 to the base plate 20. With this inclined configuration, the retainer 42 may be simply pulled by its collar 44 from the base plate 20, with the hook upper surfaces 48a being compressed together by the conical seat 52 as the retainer 42 is moved upwardly through the first hole 28. In this way, the retainer 42 may be simply removed to disassemble the capture plate 30 from the base plate 20 if desired. However, with the hooks 48 being disposed in the counterbore 50 with the springs 46 being uncompressed, the hooks 48 prevent disassembly of the capture plate 30 from the base plate 20 for maintaining a three-piece assembly thereof.

Referring again to FIG. 1, in order to remove the tubes 12 from the recesses 26, the fastener 38 must be unthreaded at least for the depth $d_2$ of the lips 40 to allow the capture plate 30 to be rotated about the fastener 38 and the retainer 42 with the lips 40 clearing the tubes 12 without obstruction. Accordingly, suitable threads are provided at the distal end of the bolt 38a below the nut 38b for an axial extent $d_3$ which is equal to at least the depth $d_2$ of the lips 40. In this way, the bolt 38a may be slightly unthreaded from the nut 38b to allow the capture plate 30 to be lifted upwardly relative to the base plate 20.

However, the retainer 42 must be suitably configured to also allow the capture plate 30 to be so lifted. As shown in FIG. 1, the hook upper surfaces 48a are preferably spaced axially from the counterbore seat 52 when the capture plate 30 is clamped against the base plate 20 to provide a suitable axial clearance $d_4$ between the hooks 48 and the seat 52 for allowing the capture plate 30 to be correspondingly spaced from the base plate 20 when the fastener 38 is unthreaded. In this way, without constraint by the fastener 38, the capture plate 30 may be lifted relative to the base plate 20 for the axial extent $d_4$ until the hooks 48 abut the seat 52. By sizing the axial spacing $d_4$ at least equal to the lip depth $d_2$, the capture plate 30 may be suitably lifted so that it may be rotated without obstruction over the tubes 12 for allowing insertion into and removal from the first recesses 26 of the tubes 12.

The tube clamp 16 described above compared to a conventional hinged tube clamp is accordingly simpler in structure and allows insertion or removal of the tube 12 by simply loosening the fastener 38 and rotating the capture plate 30. In the conventional hinged tube clamp, its fastener must be completely removed before the two hinged clamp-halves may be pivoted apart to insert or remove a tube therein. Although the tube clamp 16 may be formed of conventional metals such as aluminum, stainless steel, or Inconel, in the preferred embodiment illustrated in FIG. 1, both the base and capture plates 20, 30 are preferably formed of a composite, preferably non-metal, material, and the tube clamp 16 is characterized by the absence of discrete wear sleeves surrounding the tubes 12 in the first recesses 26 as would be required in a conventional tube clamp. A composite tube clamp 16 will, therefore, have significant weight savings over a metal embodiment thereof and will also have inherent damping capability significantly greater than that may be obtained from metal tube clamps. This damping will reduce the vibratory energy in the tubes 12 and will increase the useful life thereof.

A composite tube clamp 16 may be formed of conventional polymeric resins as are commercially available. For example, clamps 16 used in the cooler regions of the engine, near the fan for example, may be made from low temperature resins like epoxy or bismaleimide (BMI). In hotter regions of the engine, polymide resin composites, for example PMR15, may be used due to their greater temperature capability. Furthermore, structural fibers may be used in a matrix for providing selective strength of the tube clamp 16. For example, conventional fibers, such as fiberglass or carbon fibers or polymeric fibers, may be used in a suitable resin matrix such as those disclosed above. The fibers may be oriented at random or may be aligned as required for obtaining suitable strength of the base and capture plates 20, 30.

The resin forming the tube clamp 16 may be selected to provide self lubrication between the tube clamp 16 and the tubes 12 as the tube clamp 16 itself abrades at the first recesses 26 which further allows the conventional wear sleeve to be eliminated. For example, the fibers or resin can abrade during operation for releasing dust or powder which act as a dry lubricant between the tubes 12 and the tube clamp 16. Although the conventional wear sleeves are preferably omitted to reduce the number of parts, and manufacturing and assembly requirements to reduce cost, they may be used if desired. Or, conventional wear coatings may be applied to the recesses 26 to reduce tube wear.

Accordingly, the tube clamp 16 may be specifically designed for the different temperature environments of the engine 10 from relatively cool to relatively hot regions thereof. The tube clamp 16 may be suitably distinguished for the respective temperature regions by using suitable color coding thereof or characteristic shapes thereof. The temperature capability of the tube clamp 16 may be increased by using conventional material additives thereto or coatings thereon for use in higher temperature regions.

The retainer 42 of the tube clamps 16 may itself also be made of the same lightweight composite materials as that of base and capture plates 20, 30, or may be made from suitable metals as those used in conventional tube clamps.

The tube clamp 16 described above thus provides improved maintainability by allowing the base and capture plates 20, 30 to simply pivot relative to each other when loose to allow the tubes 12 to be removed from the recesses 26 without completely removing the fastener 38. The three-piece tube clamp 16 additionally forms a single clamp assembly which further improves maintainability since the parts thereof may be preassembled together and be stored in inventory as a single assembly. The retainer 42 may be simply inserted or removed from the base and capture plates 20, 30 by either being press fit therein or pulled therefrom, respectively. If desired, suitable tools may be provided for inserting or withdrawing the retainer 42 from the coaxially aligned first and second holes 28, 36.

While there have been described herein what are considered to be preferred embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A clamp for mounting a tube to a support plate in a gas turbine engine comprising:
   a base plate including a lower surface disposable on said support plate, a flat upper surface having an arcuate first recess therein for receiving said tube, a first hole spaced from said first recess and extending through said base plate from said lower to upper surfaces thereof, and a counterbore extending into said base plate lower surface coaxially with said first hole;
   a capture plate including a lower surface facing said base plate upper surface, an upper surface, and a second hole extending through said capture plate from said lower to said upper surfaces thereof; and
   a tubular retainer extending through said first and second holes for retaining together said base and capture plates while allowing rotation therebetween about said retainer, said retainer being sized for receiving a fastener therethrough for clamping said capture plate to said base plate, with said capture plate lower surface being effective for clamping said tube against said first recess, and said retainer comprising:
   an annular collar at a proximal end thereof;
   a plurality of circumferentially spaced apart integral cantilever springs extending from said collar to a distal end of said retainer;
   each of said springs including a hook at said retainer distal end; and
   said retainer extending through said first and second holes, with said collar being disposed on said capture plate upper surface and said springs extending into said counterbore so that said hooks join said retainer to said base plate.

2. A tube clamp according to claim 1 wherein:
   said counterbore includes a conical seat extending to said first hole; and
   said hooks have upper surfaces inclined complementarily to said conical seat for abutting contact therewith for joining said retainer to said base plate.

3. A clamp according to claim 2 wherein said retainer has an outer diameter at said hooks, and said second hole has a diameter, and said hook outer diameter is predeterminedly greater that said second hole diameter so that said retainer springs compress towards each other upon insertion of said retainer through said second hole.

4. A clamp according to claim 3 wherein said hook upper surfaces are spaced axially from said conical seat for allowing said capture plate to be correspondingly spaced from said base plate during insertion into and removal from said first recess of said tube.

5. A clamp according to claim 4 wherein:
   said tube has an outer diameter; and
   said first recess has a first depth less than said tube outer diameter preselected for providing a predetermined compressive load on said tube when said fastener clamps together said base and capture plates.

6. A clamp according to claim 5 wherein:
   said first recess is sized for receiving said entire tube outer diameter; and
   said capture plate includes a distal end positionable adjacent to said tube, and said capture plate lower surface, at least up to said capture plate distal end, is completely flat.

7. A clamp according to claim 6 wherein said capture plate distal end is in the form of a lip extending toward said base plate upper surface, and is positionable adjacent to said tube on an opposite side thereof relative to said capture plate second hole, said lip having a lip depth less than said tube outer diameter for preventing rotation of said capture plate about said retainer when said capture plate abuts said base plate.

8. A clamp according to claim 7 wherein said base and capture plates are formed of composite material, said clamp is characterized by the absence of a wear sleeve surrounding said tube in said first recess, and said collar has a diameter larger than the diameter of a head of said fastener to spread compression load to said capture plate.

9. A clamp according to claim 7 wherein;
   said base plate includes a pair of said first recesses disposed on opposite sides of said base plate first hole for receiving a pair of said tubes, respectively;
   said capture plate includes a pair of said lips on opposite sides of said capture plate second hole; and
   said capture plate is effective for clamping said pair of tubes to said base plate upon loading of said fastener.

* * * * *